United States Patent Office 3,226,820
Patented Jan. 4, 1966

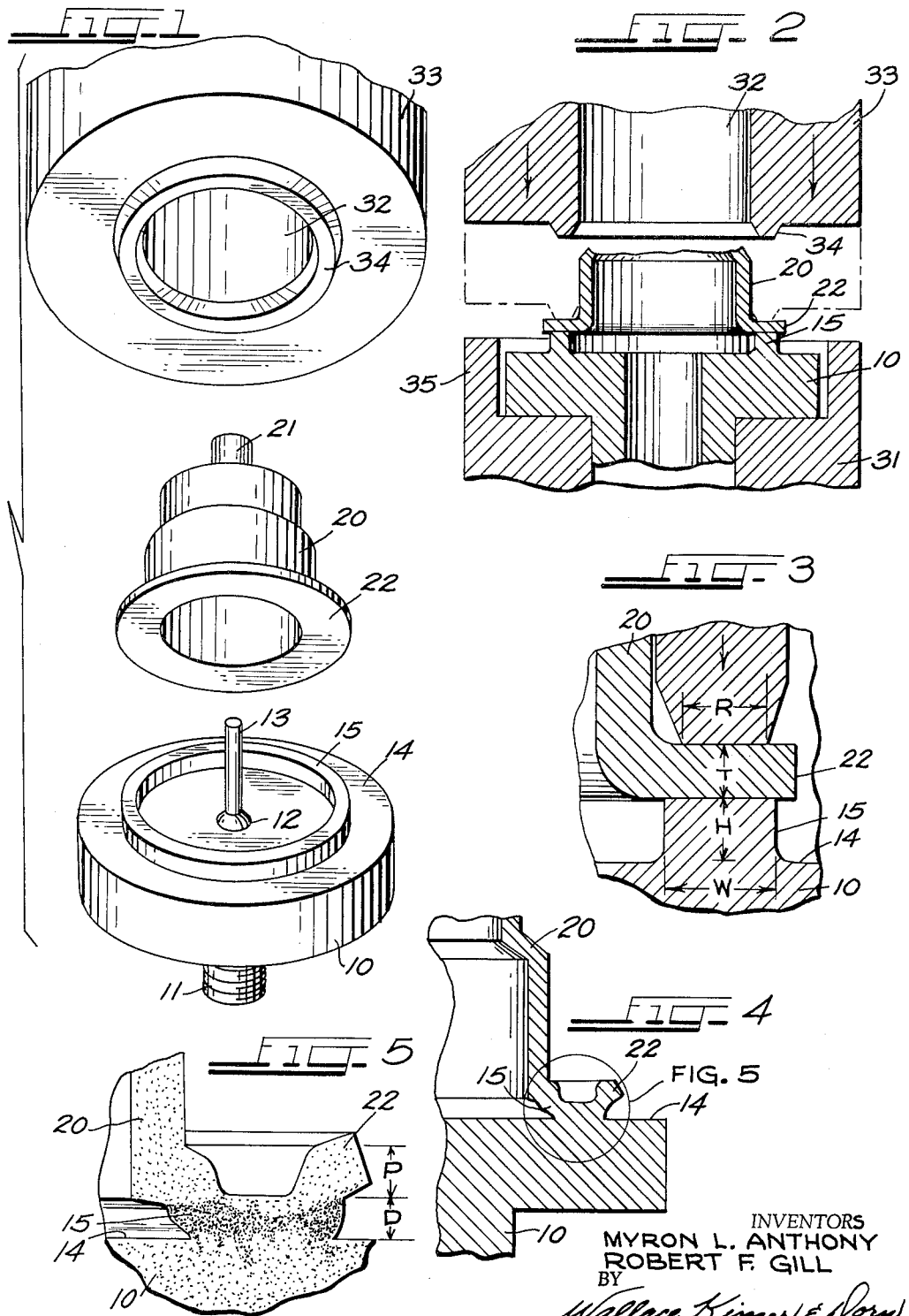

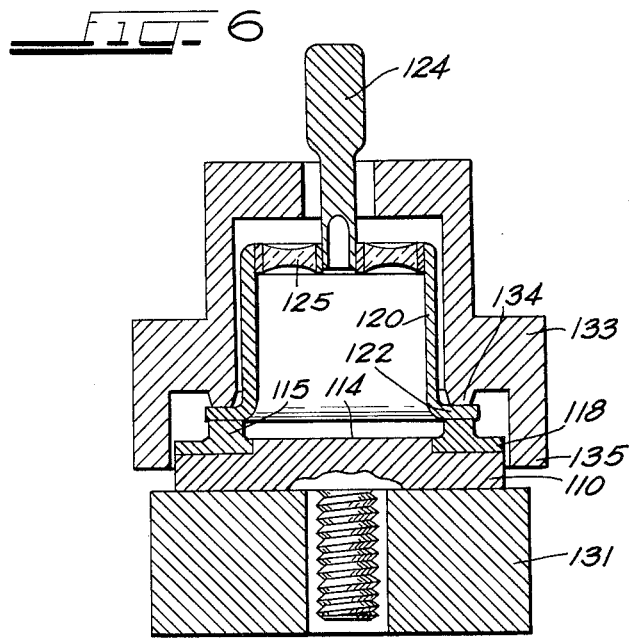

3,226,820
METHOD OF MANUFACTURING HERMETICALLY SEALED ENCLOSURES
Myron L. Anthony and Robert F. Gill, Jr., La Grange, Ill., assignors to Scully-Anthony Corporation, La Grange, Ill., a corporation of Illinois
Filed Feb. 11, 1963, Ser. No. 257,455
2 Claims. (Cl. 29—470.1)

This invention relates to cold pressure welding, and more particularly to the manufacture of hermetically sealed enclosures for electrical or electronic devices by means of a novel and improved cold pressure welding technique.

In the manufacture of hermetically sealed enclosures for transistors, diodes, crystal filters, and similar electrical and electronic devices, it is frequently desirable to avoid substantial heating of the enclosure, as is entailed in a conventional welding operation or even in soldering. Nevertheless, in many such devices it may be essential to obtain a high-strength bond between the enclosure parts, particularly where the devices are to be used under adverse operating conditions. Consequently, cold pressure welding is achieving increasing recognition as a preferred method of joining the component parts of hermetically sealed enclosures for electrical or electronic devices.

The two mating parts of the enclosure are usually provided with outwardly extending flanges that are quite thin in cross section. The enclosure members and the flanges may be formed from copper, aluminum, alloys of copper or aluminum, or from other ductile metal that is adapted to cold pressure welding. To bond the enclosure parts to each other, the parts are disposed in a press with their respective flanges in aligned mating engagement and the flanges are then subjected to very high pressures between mating dies. This system is commercially successful, but is not well adapted to the fabrication of enclosures of the kind comprising at least one element that is of relatively heavy and rigid construction, as in the case of a diode base that is also used as a heat sink.

In one proposed method for fabricating a heavy-base electronic device enclosure, by cold pressure welding, the base is provided with a peripheral groove and the mating cap member of the enclosure is provided with a flange that overlies the groove. Sealing is accomplished by forcing the flange on the cap downwardly into the groove and subsequently filling at least a portion of the groove with solder. The resulting joint, however, is not as strong as is required in many applications. Moreover, the heating of the base attendant to deposition of the solder is frequently objectionable.

In another previously known technique for manufacturing heavy-base electronic device enclosures, the base is provided with a thin flange that is inset with respect to the peripheral edge of the base and is spaced from a radial surface on the base. A steel or other hard metal ring is mounted on the base surface below this flange. The cap member is provided with a flange that overlies the base member flange. Cold pressure welding of the base and cap is effected by application of a high pressure to the cap flange in a direction forcing that flange and the base flange toward the hard ring mounted on the base. The hard metal ring constitutes one of the pressure welding tools, since it is this member that provides the opposing force relative to the external tool used for cold pressure welding.

It is an object of the present invention to afford a new and improved method of hermetically sealing a cap member to a heavy rigid base member, in the manufacture of a hermetically sealed enclosure for an electrical or electronic device, in which the base and cap members are cold pressure welded to each other.

It is a specific object of the invention to provide a new and improved method of hermetically sealing the enclosure members for an electrical or electronic device, by cold pressure welding, that inherently provides for minimization of the size of the completed enclosure.

Another object of the invention is to provide hermetic seals of superior strength in enclosures for electrical or electronic devices in which the enclosure elements are joined to each other by cold pressure welding.

Another object of the invention is to reduce the cost of tooling to a minimum in the manufacture of hermetically sealed enclosures for electrical or electronic devices of the heavy-base type, where such enclosure are sealed by cold pressure welding.

Another object of the invention is to eliminate any steel rings or similar elements in the manufacture of a heavy-base electronic device enclosure by cold pressure welding.

It is a specific object of the invention to afford a continuous cold pressure welded seal, in an enclosure for an electrical or electronic device, that is of superior strength, yet requires only a single pressure welding tool.

Accordingly, the invention is directed to the manufacture of hermetically sealed enclosures for electrical or electronic devices, such enclosures being of the kind comprising a heavy rigid base member joined to a cap member. In accordance with the invention, the method of hermetically sealing the base member to the cap member comprises forming, on the base member, a continuous ductile metal shoulder of a given continuous closed surface configuration, this shoulder preferably being substantially rectangular in cross section. The cap member that is to be joined to the base member is provided with a continuous ductile metal flange of continuous closed surface configuration that corresponds substantially to the configuration of the metal shoulder on the base member. Before they are joined, the surfaces of the base member shoulder and the cap member flange are first treated to remove any lubricants or other contaminants and to afford high friction surfaces; this treatment may entail deliberate oxidation of the surfaces or may entail deposition of a very thin film of a hard metal, such as nickel, on the mating surfaces. The cap and base members are then aligned with each other and with the cap member flange abutting the base member shoulder. The flange is then indented, from the side opposite the base member shoulder and without the application of external heat, using a continuous closed-surface indenting tool corresponding in configuration to the configuration of the base member shoulder. This indenting tool should have a width no greater than the width of the base member shoulder. The indenting operation compresses the flange and the shoulder together to afford a continuous hermetically sealed solid phase cold pressure welded bond between the two enclosure members.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:
FIG. 1 is an exploded perspective view of the mating parts for an electrical or electronic device enclosure to be fabricated in accordance with the present invention;
FIG. 2 shows the apparatus used to join the mating parts of FIG. 1 by cold pressure welding;
FIG. 3 is a detail view, drawn to an enlarged scale, of a part of the apparatus of FIG. 2;

FIG. 4 is a detail sectional view of a part of a completed enclosure fabricated in accordance with the present invention;

FIG. 5 is an enlarged detail view of the encircled portion of FIG. 4; and

FIG. 6 is a sectional elevation view, similar to FIG. 2, showing another application of the present invention.

FIG. 1 shows the two mating enclosure members that are to be joined to afford a hermetically sealed enclosure for an electrical or electronic device, in accordance with the present invention. The base member 10 is a relatively heavy and thick member, in this instance formed from a ductile metal such as copper, aluminum, or a suitable coper or aluminum alloy. Typically, base member 10 may be fabricated entirely from commercial oxygen-free high-conductivity copper. Base member 10 may be provided wth a threaded terminal connection 11 or may be of such other external configuration as is required by the application in which the completed device is to be used. The base member 10 suports the electronic or electrical device that is to be enclosed as, for instance, a rectifier element 12 having a vertically projecting conductive lead 13.

In accordance with the present invention, the upper surface 14 of base member 10 has formed thereon a continuous ductile metal shoulder 15. Shoulder 15 is of continuous closed surface configuration, the geometrical figure defined by the shoulder in this instance being a circle. Alternatively, an elliptical shape, a rectangular shape, or any other desired closed configuration may be employed. Shoulder 15 is preferably substantially rectangular in cross sectional configuration, as more clearly shown in FIGS. 2 and 3; the shoulder has a given height H and a substantially constant width W.

The mating part of the enclosure is the cap member 20. The upper portion of cap member 20 may be of any desired configuration to meet the requirements of the completed enclosure and may include at least one terminal connection element extending through the top portion 21 of the cap and engageable with the conductive lead 13 of the base assembly. Cap member 20 may be fabricated from any ductile metal that can be cold pressure welded to the ductile metal of base member 10. Thus, OFHC copper is preferably employed for the cap where the base 10 is fabricated from this material.

Regardless of the materials used in other parts of the cap member 20, it must be provided with a continuous ductile metal flange 22 that can be cold pressure welded to the metal comprising shoulder 15 of the base member. Flange 22 is of continuous closed surface configuration and corresponds substantially to the configuration of shoulder 15. Preferably, the width of flange 22 is somewhat greater than the width of shoulder 15. Furthermore, it is usually desirable that the thickness T of the flange 22 (FIG. 3) be substantially less than the height H of the shoulder 15.

Before cap member 20 is joined to base member 10, the opposed surfaces of flange 22 and shoulder 15 should be treated to remove any lubricants or other contaminants therefrom. Furthermore, these surfaces should be treated to afford high friction during cold pressure welding thereof. One preferred method is to deposit a thin coating of electroless nickel on the mating surfaces of the flange and the shoulder, as described in detail in the co-pending application of Myron L. Anthony and Robert F. Gill, Jr., Serial No. 134,908, filed August 30, 1961. Using this technique, the nickel film need be no greater than 0.0001 inch in thickness; a plating of grossly greater thickness is not desirable as it prevents a direct weld between the flange 22 and the shoulder 15.

Another technique, particularly applicable where aluminum is used for the enclosure members, is to subject the members to controlled oxidation to form a thin film of aluminum oxide on the mating surfaces. This method is described and claimed in the co-pending application of Myron L. Anthony, and Robert F. Gill, Serial No. 134,909, filed August 30, 1961. In any event, the quality of the ultimate weld is greatly enhanced by appropriate treatment to assure high friction between the surfaces during cold pressure welding.

After treatment to attain the desired high-friction qualities at the flange and shoulder surfaces, base member 10 and cap member 20 are aligned with each other, with flange 22 disposed in abutting engagement with shoulder 15. This may be accomplished by disposing base member 10 in a suitable jig 31 and by engaging cap member 20 in a central aperture 32 of a cold pressure welding tool 33.

The welding or indenting tool 33 includes a continuous closed-surface indenting element 34 having a configuration corresponding to the configuration of shoulder 15 and, accordingly, to the configuration of flange 22. In the illustrated arrangement, indenting tool element 34 is of circular configuration. As best shown in FIG. 3, the effective width R of the indenting tool, at the point of contact with flange 22, is preferably substantially smaller than the width W of shoulder 15. In any event, the effective width of the indenting tool should not be greater than the shoulder width W.

To complete the enclosure by hermetically sealing members 10 and 20 to each other, the indenting tool 33 is driven downwardly, as viewed in FIG. 2, driving the medial portion of flange 22 into shoulder 15. The indenting operation, which is carried out without the application of external heat, is effected at a high pressure, and cold pressure welds flange 22 to shoulder 15.

The degree of indentation of flange 22 and shoulder 15 necessary to achieve a strong hermetically sealed weld between the flange and the shoulder is subject to some variation, depending upon the thickness of flange 22, the dimensions of shoulder 15, the width of the indenting tool, the hardness of the metals used, and other factors. On the other hand, the degree of penetration must be maintained within certain limits in order to afford an adequate bond. If the indentation is too great, there is a substantial tendency to shear off flange 22, with the result that a relatively weak structure is obtained. On the other hand, insufficient penetration results in an incomplete seal having a tendency to leak.

Where the cold pressure welding operation is carried out in a normal atmosphere, the penetration P should be at least equal to one-half the sum of the shoulder height H and the flange thickness T and should be no greater than three-fourths the sum of the original thickness $H+T$ of the shoulder and the flange. Stated differently, the total resultant thickness of the metal at the center of the weld, the distance D in FIG. 5, should be from twenty-five to fifty percent of the original total height $H+T$, reflecting a total penetration of between fifty and seventy-five percent during the cold pressure welding operation. The preferred penetration is about sixty percent using unannealed OFHC copper.

The technique of the present invention does not require the provision of flanges extending outwardly of the base and cap members 10 and 20, and particularly the base member 10. Instead, the cold pressure welded seal between the two members may be located inwardly of the periphery of base member 10, keeping the overall size of the resulting enclosure to a minimum. The method of the invention gives a strong, hermetically sealed bond, the bond ordinarily being as strong as the surrounding metal itself. It is not necessary to mount a special tool of any kind on base member 10 and, indeed, tooling is kept to an absolute minimum since only the one welding tool 33 is required. Moreover, there is no steel or other magnetic member introduced into the completed enclosure.

In the foregoing description, it is assumed that the cold pressure welding operation is carried out in an ordinary atmospheric environment. The quality and consistency of the seal can be improved, however, by using a controlled atmosphere. Thus, after the two enclosure parts have been treated to remove oil, grease, and other contaminants, and after the mating surfaces have been appropriately treated to increase their frictional or galling properties, the parts should be kept in a dry atmosphere to afford protection against subsequent contamination of the surfaces to be welded. An inert gas atmosphere, such as a dry nitrogen atmosphere, is suitable for this purpose.

It is helpful to continue the controlled atmosphere procedure completely through the cold pressure welding of the parts. As pointed out in the aforementioned applications of Myron L. Anthony and Robert F. Gill, the greater the surface friction the better the welding properties. Even the water vapor entrained in the atmosphere has some effect upon the cold pressure welding operation. The desired high-friction properties of the surfaces can be enhanced by using an atmosphere of dry nitrogen, or other dry gas to which the metal surfaces are substantially inert, during welding. Even better performance is achieved if the cold pressure welding operation is carried out in a substantial vacuum. Where the cold pressure welding operation is effected in a vacuum, the degree of penetration required in the cold welding step may be materially reduced.

FIG. 6 illustrates another example of the present invention, in which a base member 110 is cold pressure welded to cap member 120. In this instance, base member 110 is not of homogenous construction. The major portion of the base member is formed from a relatively strong hard metal, which may be either a non-magnetic steel or a non-ferrous alloy. The upper surface 114 of the base member, however, is provided with an insert 118 of a more ductile metal such as copper. The insert 118 may be cast integrally with the body portion of base member 110 or may be brazed thereto. The ductile metal insert 118 is provided with a projecting shoulder 115 that is of continuous closed configuration and is substantially rectangular in cross section.

The cap member 120 in the embodiment of FIG. 6 includes a flanged portion fabricated from a ductile metal, such as copper, the flange 122 having a configuration corresponding to the closed configuration of shoulder 115. Flange 122 is preferably made substantially wider than the width of shoulder 115 so that the flange overlaps the outer edge of the base member shoulder. Cap 120 is also provided with one or more electrical leads 124 that are insulated from the cap by a suitable vitreous insulator member 125.

Preliminarily, cap member 120 and base member 110 are treated in the same way as members 20 and 10 in the previously described embodiment. Thus, the surfaces to be cold welded must be cleaned and should be treated to afford the desired high friction properties. The parts are then aligned in the position shown in FIG. 6, the base member 110 being supported upon a jig 131 and the cap member 120 being disposed within an indenting tool 133 having an indenting element 134. In this instance, indenting tool 133 is provided with a projecting flange or skirt portion 135 that extends down beyond the outer edge of base member 110 when the parts are in the position illustrated in FIG. 6.

As before, the indenting tool 133 is forced downwardly, as seen in FIG. 6, to afford a continuous hermetically sealed solid phase cold pressure weld between cap member flange 122 and base member shoulder 115. Preferably, the penetration is of the order of sixty percent of the total thickness of the flange and shoulder elements, using unannealed copper, although a smaller penetration can be employed if the cold pressure welding operation is effected in a vacuum. The skirt or flange 135 on the indenting tool serves to restrain the ductile metal of insert 118 and to prevent undue expansion of the ductile metal insert beyond the outer periphery of base member 110. In all other respects, the cold pressure welding operation is essentially similar to that described above.

In the practice of the present invention, there is some tendency toward expansion of the base during the cold pressure welding step. Expansion is minimal if the shoulder 15 of the first embodiment, or the shoulder 115 of the second, is spaced inwardly from the periphery of the body of the base. To prevent such expansion in designs where the shoulder is necessarily close to the periphery, it is desirable to restrain the periphery of the base, as by means of the flange 35 on jig 31 (FIG. 2) or the flange 135 on tool 133 (FIG. 6).

The invention is not dependent upon the particular vertical alignment of the base jig and the indenting tool shown in FIGS. 2 and 6. These may be inverted, if desired, or turned to any angle desired, without affecting the invention.

As a specific example of the present invention, the following dimensional data are furnished; it should be understood that these data are exemplary only and in no sense constitute a limitation on the invention:

Base 10 (hexagonal shape) minimum diameter _____ inch__ 0.544
Base 10—overall thickness _____do____ 0.437
Shoulder height H _____do____ 0.030
Shoulder width W _____do____ 0.030
Shoulder diameter, outside _____do____ 0.417
Flange thickness T _____do____ 0.020
Penetration P _____percent__ 64

All of these parts are fabricated from unannealed OFHC copper, and are coated with a film of electroless nickel, as described above. The resultant enclosure structure is a strong, hermetically sealed enclosure.

In some applications, it may prove necessary or even desirable to use a metal softer than the aforementioned unannealed OFHC copper. Under these circumstances, the shoulder height H should be increased in height to provide for greater indentation to secure a satisfactory weld. The shoulder width W need not be increased to the same extent, though the generally rectangular cross-sectional configuration for the shoulder should be retained.

In the foregoing description and in the drawings, the major portion of the cap structure is shown and described as being of metal. The invention is equally applicable to cap structures of ceramic or other insulator material to which a suitable metal flange is mounted in hermetically sealed relation. Furthermore, it will be understood that there is no fixed limitation on the number of electrical leads brought out through either the base or the cap. There may be one or more leads through either or both of these members; conversely, either member may be formed entirely of metal, as in the case of the illustrated bases.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

I claim:

1. In the manufacture of a hermetically sealed enclosure, for an electrical or electronic device, of the kind comprising a relatively heavy and rigid base member hermetically sealed to a cap member, the method of hermetically sealing said base member to said cap member comprising:

forming, on the surface of a rigid base member, a continuous closed-configuration shoulder of ductile metal, said shoulder being substantially rectangular in cross-section and having a given width W and a given height H;

aligning said base member with a cap member having a continuous ductile flange of given thickness T substantially corresponding in configuration to said shoulder, with said cap member flange abutting said shoulder;

and indenting said flange from the side opposite said shoulder, without application of external heat, with a continuous-surface indenting-tool having a width no larger than said shoulder width W to a depth D such that D is equal to at least one-half the sum of H and T and is no greater than three-fourths the sum of H and T, to afford a continuous hermetically sealed solid phase cold pressure welded bond between the ductile metals of said flange and said shoulder.

2. In the manufacture of a hermetically sealed enclosure, for an electrical or electronic device, of the kind comprising a relatively heavy and rigid base member hermetically sealed to a cap member, the method of hermetically sealing said base member to said cap member comprising:

forming, on the surface of a rigid base member, a continuous closed-configuration shoulder of ductile metal, said shoulder being substantially rectangular in cross-section and having a given width W and a given height H;

aligning said base member with a cap member having a continuous ductile flange of given thickness T substantially smaller than said height H and a width greater than said width W, but substantially corresponding in configuration to said shoulder, with said cap member flange abutting said shoulder;

and indenting said flange from the side opposite said shoulder, without application of external heat, with a continuous-surface indenting-tool having a width no larger than said shoulder width, to a uniform depth D such that D is equal to at least one-half the sum of H and T and is no greater than three-fourths the sum of H and T, to afford a continuous hermetically sealed solid phase cold pressure welded bond between the ductile metals of said flange and said shoulder.

References Cited by the Examiner

UNITED STATES PATENTS

| 2,758,368 | 8/1956 | Ulam | 29—494 X |
| 3,139,678 | 7/1964 | Anthony et al. | 29—470.1 |
| 3,178,811 | 4/1965 | Fuller | 29—470.1 |
| 3,193,920 | 7/1965 | Culberston et al. | 29—497.5 |

JOHN F. CAMPBELL, *Primary Examiner.*